United States Patent Office 3,418,291
Patented Dec. 24, 1968

3,418,291
POLYMERS OF UNSATURATED HETEROCYCLIC-SUBSTITUTED LACTONES AND METHOD FOR THEIR PREPARATION
Harald H. O. Chedron, Ittenbach (Rhine), Hans H. W. Ohse, Oberdollendorf (Rhine), Richard A. Palm, Niederdollendorf (Rhine), Wilfried Draber, Ippendorf, Bonn, Juergen F. Falbe, Bonn, and Friedrich W. A. G. K. Korte, Hangeler, Germany, assignors to Shell Oil Company, New York, N.Y., a corporation of Delaware
No Drawing. Original application July 2, 1964, Ser. No. 380,028, now Patent No. 3,373,169. Divided and this application June 26, 1967, Ser. No. 659,255
10 Claims. (Cl. 260—78.3)

ABSTRACT OF THE DISCLOSURE

Polymers of unsaturated heterocyclic-substituted propiolactones are disclosed. Also disclosed are methods of preparing the unsaturated heterocyclic-substituted propiolactones and how to polymerize them through the unsaturated linkage leaving the lactone groups intact.

---

This is a division of application Serial No. 380,028, filed July 2, 1964, now U.S. Patent 3,373,169.

This invention relates to new lactones, their polymers and preparation. More particularly, the invention relates to a new class of unsaturated heterocyclic-substituted lactones, their preparation from unsaturated heterocyclic aldehydes and to the polymerization of these compounds produced valuable polymeric products.

The invention specifically relates to new unsaturated heterocyclic-substituted lactones having a propiolactone group substituted with a heterocyclic ring containing an ethylenic group adjacent to the hetero atom, such as for example, 2-(3',4'-dihydro-2'-H-pyran-2'-yl) beta-propiolactone. These new substituted lactones are preferably obtained by reacting the corresponding unsaturated heterocyclic aldehyde with ketone preferably at a temperature below 20° C. The invention further provides new and valuable homopolymers and copolymers prepared by contacting the above-described heterocyclic-substituted propiolactones with an ionic initiator.

The invention particularly provides new dihydropyranyl propiolactones having the structure

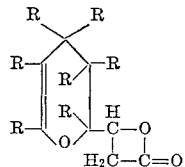

wherein R is hydrogen or an alkyl radical.

As a special embodiment, the invention also provides new polymeric products possessing intact lactone groups which are prepared by homopolymerizing or copolymerizing the above-described dihydropyranyl propiolactones with an ionic initiator.

It is an object of the invention to provide a new class of unsaturated lactones and a method for their preparations. It is a further object to provide new unsaturated heterocyclic-substituted propiolactones which may be polymerized with ionic initiators. It is a further object to provide new polymeric lactones which may be used for many important applications in industry. It is a further object of the invention to provide new polymeric lactones which can be used as curing agents for epoxy resins. It is a further object to provide a new class of polymeric lactones which can be polymerized through the lactone group. These and other objects of the invention will be apparent from the following detailed description thereof.

It has now been discovered that these and other objects of the invention may be accomplished by the new unsaturated heterocyclic-substituted lactones which possess a propiolactone group substituted with a heterocyclic ring containing an ethylenic group adjacent to a hetero atom such as, for example, 2-(3',4'-dihydro-2'-H-pyran-2'-yl)-beta-propiolactone. These new lactones possess many new and valuable properties which make them useful in industry. It has been found, for example, that these special lactones can be polymerized with ionic initiators to form polymeric products having the lactone group intact. The resulting polymeric products possessing a plurality of active lactone groups also possess new and valuable properties which make them of considerable use in industry. They have been found to be particularly useful, for example, as curing agents for epoxy resins and in the preparation of polyesters.

The new unsaturated heterocyclic-substituted lactones of the present invention are those having a propiolactone group substituted with a cyclic structure containing an ethylenic group adjacent to a heteroatom. By "heteroatom" is meant a polyvalent atom other than carbon, such as, for example, oxygen, nitrogen, sulfur, phosphorus, arsenic, antimony, tin, lead, silicon, and the like. Cyclic groups which contain both the heteroatom and the ethylenic group include, among others, the dihydropyranyl, tetrahydropyridine, thiophene, pyrrole, furan, and the like, and their substituted derivatives such as, for example, their halogenated, alkylated, alkoxy substituted derivatives and the like. A preferred group of these compounds may be illustrated by the following general formula

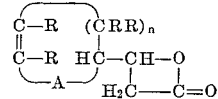

wherein R is a hydrogen, halogen or hydrocarbon radical, A is oxygen, nitrogen or sulfur and n is 1 to 2.

A particularly preferred group of the compounds include those of the general formula

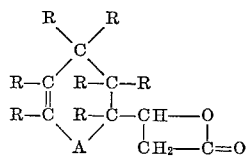

wherein R is hydrogen, halogen, or an alkyl radical, and A is oxygen or sulfur.

Representative examples of these compounds include 2-(3',4'-dihydro-2'-H-pyran-2'-yl)-beta-propiolactone,
2-(3',4'-dibutyl-3',4'-dihydro-2'-H-pyran-2'-yl)-beta-propiolactone,
2-(3'-chloro-3',4'-dihydro-2'-H-pyran-2'-yl)beta-propiolactone,
2-(4'-octyl-3',4'-dihydro-2'H-pyran-2'-yl)-beta-propiolactone,
2-(2',3',4'-trichloro-3',4'-dihydro-2'-H-pyran-2'-yl)-beta-propiolactone,
2-(4'-allyl-3',4'-dihydro-2'-H-pyran-2'-yl)-beta-propiolactone,
2-(4'-cyclohexyl-3',4'-dihydro-2'-H-pyran-2'-yl)-beta-propiolactone,
2-(2',3'-dihydro-thiophen-2'-yl)-beta-propiolactone,
2-(2',3'-dihydrofuran-2'-yl)-beta-propiolactone.

The unsaturated heterocyclic-substituted propiolactones may be prepared by a variety of different ways. They may be prepared, for example, by reacting the corresponding unsaturated heterocyclic-substituted aldehyde with ketene, preferably at a temperature below 20° C. Detailed description of this type of reaction may be found in U.S. 2,478,388 and U.S. 2,518,662.

Temperatures below 20° C., in particular below −10° C., may be suitably used for the purpose. The optimum temperature range depends on the catalyst used. If, for example, boron trifluoride etherate is used as catalyst, the preferred temperature is below −50° C. If other catalysts of the Friedel-Crafts type are employed, such as, for example, zinc chloride, aluminum chloride or iron tri-chloride, the reaction temperatures selected may advantageously be above −50° C. Suitable solvents for the preparation of the lactones are, for example, diethylether, di-isopropyl ether, dioxane and carbon tetrachloride. The use of methylene chloride as a solvent may facilitate the separation of the catalyst and lead to good yields, as there will be less premature polymerization during the final distillation of the unsaturated lactones. As long as the distilling temperature remains below 150° C. there is practically no decomposition of the lactones as a result of decarboxylation.

The new unsaturated heterocyclic-substituted propiolactones vary from liquids to solids. The dihydropyranyl propiolactones are viscous, transparent oils. They may generally be decarboxylated into vinyl dihydropyran at about 200° C. The new substituted lactones are soluble in aromatic and chlorinated hydrocarbons and other polar solvents, but substantially insoluble in water. They are compatible with many different types of resins, tars, oils and the like.

The new unsaturated heterocyclic-substituted propiolactones may be used for a variety of different applications. They may be used, for example, as plasticizers, extenders, lubricating oils, and the like, and may be used as intermediates in the preparation of many new and valuable derivatives.

The new unsaturated heterocyclic-substituted propiolactones are particularly useful and valuable in the preparation of new and valuable polymeric products. They may be polymerized through the lactone groups and leave the ethylenic group intact or they may be polymerized through the double bond and leave the lactone groups intact. This latter reaction is preferred. This may be accomplished by homopolymerizing or copolymerizing the lactones with themselves or with other ethylenically unsaturated compounds.

It is known from U.S. patent specifications 2,624,723 and 2,585,537 that methylene-beta-gamma-delta-lactones may be copolymerized in the presence of radical-yielding catalysts to form products containing intact lactone groups. Recommended for use as radical initiators are, for example, azo-bis-isobutyric acid nitrile, benzoyl peroxide and the like.

It has been found that radical initiators such as, e.g., peroxides, have substantially no polymerization initiating effect on the above-noted heterocyclic-substituted propiolactones. It has further been found, however, that these new lactones may very well be polymerized or copolymerized when ionic, in particular cationic initiators are employed. Surprisingly, the lactone ring is not split in the process as is known, for example, in the ionic polymerization of inter alia beta-propiolactone into polyesters (of Makrom, Chemie 48 (1961) 229–233).

Suitable cationic initiators are, for example, boron trifluoride, acetyl perchlorate, aluminum chloride, zinc chloride, titanium tetrachloride, iron trichloride and trifluoro acetic acid, as well as their complexes such as, for example, the complex of iron trichloride and propylene oxide or of boron trifluoride and diethylether. Preferred initiators are acetyl perchlorate, boron trifluoride, titanium tetrachloride and zinc chloride. Suitable anionic initiators are organo-metallic compounds, in particular organic aluminum compounds such as, for example, diethyl aluminum monochloride and ethyl aluminum dichloride.

The initiator concentration required depends on the initiator and generally is between 0.001 and 5 mol. percent, in particular between 0.05 and 2 mol percent, based on the monomers. It has been found that with low monomer concentrations, e.g., 20%, the polymerization tends to die out after some time, for example, after 5–15 hours. By adding further amounts of initiator the polymerization may be reactivated and the conversion increased. This is not necessary with monomer concentrations of 50% and higher.

It has been found also that higher conversions may be achieved with lower polymerization temperatures, especially with temperatures below −20° C. According to the invention the new lactones may be copolymerized with monomers containing a >C=C< group, such as, for example, styrene, alpha-methyl styrene, iso-butylene, vinylacetate, acrylonitrile and methyl methacrylate. Other monomers include dichlorostyrene, ethylene, propylene, vinyl naphthalene, acrylic acid, methacrylic acid, butyl acrylate, ethyl acrylate, vinyl phenol, vinylidene chloride, vinyl chloride, vinyl ketone, methacrylonitrile, vinyl ethers, such as vinyl ethyl ether, vinyl butyl ether, allyl butyl ether, diallyl phthalate, divinyl succinate, acrylamide, alkyl glycidyl ether and the like, and mixtures thereof.

The new polymers are relatively low-molecular, white, flaky materials which are soluble in a number of solvents, such as chlorinated hydrocarbons, acetone, tetrahydrofuran, dioxane and dimethyl formamide, but insoluble in ether or petroleum ether. At a temperature between 180 and 200° C. the polymer melts with decomposing. From the presence of beta-lactone bonds (1820 cm.$^{-1}$) in the infra-red spectrum and the absence of ester bonds (1730 cm.$^{-1}$) it may be deduced that the polymers formed from unsaturated dihydropyranyl lactones polymerize via the vinyl ether double bond and that the polymer contains intact lactone groups, which may be further converted.

The polymeric lactones possessing the intact lactone groups are particularly useful as curing agents for polyepoxides. Examples of polyepoxides that may be used for this purpose include those set out in U.S. 2,633,458. In using the new lactones for this purpose, they are combined with the polyepoxides preferably in amounts varying from about 3% to 100% by weight based on the polyepoxide, and the combined mixture heated to effect the cure. Temperatures used in the cure preferably vary from about 50° C. to about 150° C. Accelerators or activators for the cure, such as tertiary amines, such as benzyldimethyl amine, quaternary ammonium salts, phosphines and the like may be added in small amounts, e.g., .1% to 5% by weight to accelerate the cure. The above polyepoxide mixture may be used in making cast and molded articles, as coatings for roadways, as adhesives and impregnating compositions and the like.

To illustrate the manner in which the invention may be carried out, the following examples are given. It is to be understood, however, that the examples are for the purpose of illustration and they are not to be regarded as limiting the invention in any way. Parts described in the examples are parts by weight unless otherwise indicated.

EXAMPLE I 392 g. (3.5 mol) of 3,4-dihydro-2H-pyran-2-carboxaldehyde were dissolved in 2.0 liters of anhydrous methylene chloride distilled over $P_2O_5$. After cooling to −70° C., 168 g. (4 mol) of ketene were condensed into the solution. 10 ml. of $BF_3$-etherate in 70 ml. of methylene chloride were subsequently added dropwise with vigorous stirring and in such a manner that the temperature of the mixture did not exceed −65° C. At first, the reaction was strongly exothermic, but at the end of the dropwise $BF_3$-addition, which took approximately 3½ hours, only a slight temperature rise was still observed. Stirring was continued at −70° C. for one more hour, after which 20 ml. of triethylamine in 50 ml. of $CH_2Cl_2$ were added dropwise. After removal of the cold batch the reaction mixture was mixed with 150 ml. of water at about −30° C. The temperature of the mixture was then raised to 0° C. so that the water became liquid, after which the mixture was rapidly cooled to about −40° C. and the ice containing the $BF_3$-triethylamine complex was immediately removed by suction. The mixture was subsequently washed with cooled methylene chloride and the filtrate dried with calcined magnesium sulphate. After 2–3 hours the mixture was filtered, and distilled after the solvent had been removed. The crude product was a yellow to reddish brown, fairly viscous liquid, which was obtained in a yield of 90–95%, based on carboxaldehyde. Distillation gave 355 g. of 2-(3′,4′-dihydro-2′H-pyran-2′-yl)-beta-propiolactone (yield 66%). To obtain a completely purified product the above-product was then again distilled in the presence of 1% of toluene di-isocyanate.

Boiling range: 85–87° C./0.02 mm., $n_D^{20}=1.4828$, $d_4^{20}=1.1764$.

EXAMPLES II–VII 2 ml. of 2-(3′,4′-dihydro-2′H-pyran-2′-yl)-beta-propiolactone prepared as in the previous example were polymerized at room temperature in the presence of various cationic initiators. At the end of the polymerization the polymer was dissolved in $CH_2Cl_2$ or acetone and subsequently precipitated by adding 6 to 8 times the amount of ether.

The results are shown in the following table:

| Experiment | Initiator | Mol of Initiator per mol of monomer | Solvent[1] | Time, hrs. | Conversion, percent | $\eta^2$ |
|---|---|---|---|---|---|---|
| 2 | $BF_3$-etherate | $1.10^{-3}$ | $CH_2Cl_2$ | 24 | 98 | 0.04 |
| 3 | $ZnCl_2$ | $1.10^{-2}$ | | 67 | 60.5 | 0.05 |
| 4 | $TiCl_4$ | $5.10^{-3}$ | | 67 | 57 | 0.05 |
| 5 | $CH_3C(O)$-$ClO_4$ | $1.10^{-3}$ | $C_6C_5CH_3$ | 24 | 80 | 0.04 |
| 6 | $BF_3$-etherate | $1.10^{-3}$ +$1.10^{-3}$ | $CH_2Cl_2$ | 15 7 | 72 | 0.04 |
| 7 | do | $1.10^{-3}$ | $(C_2H_5)_2O$ | 23 | 47.5 | |

[1] 20% 2-(3′,4′-dihydro-2′H-pyran-2′-yl)-beta-propiolactone.
[2] In a 1% acetone solution at 20° C.

EXAMPLE VIII

Similarly, 2-(3-, 4-dihydro-2′H-pyran-2′-yl)-beta-propiolactone in the form of a 50% solution in $CH_2Cl_2$ was polymerized for 17½ hours at 20° C. in the presence of 2 mol percent of ethyl aluminum dichloride. Yield 44%. The polymer had an intrinsic viscosity of $[\eta]=0.01$ measured in a 10% solution in acetone at 20° C.

EXAMPLE IX 2-(3′,4′-dihydro-2′H-pyran-2′-yl)-beta - propiolactone and styrene and an equal amount of methylene chloride were pipetted into a thoroughly dried flask with ground top which had been purged with nitrogen. Equimolar amounts of silver perchlorate and acetyl chloride were added, whereupon silver chloride precipitated spontaneously and polymerization started. The polymerization temperature was −20° C. After 15 hours the polymerization was stopped by dissolving the mixture in methylene chloride and the polymerizate was precipitated in methanol. Styrene components and beta-lactone components were clearly identifiable in the infra-red spectrum. Solution differences and titrations in combination with decarboxylation experiments showed that a genuine copolymer was obtained instead of a physical mixture. More specifically the procedure was as follows: 2-(3′-4′-dihydro-2′-H-pyran-2′-yl)-beta-propiolactone homo-polymerizate, which had been prepared with the same initiator, was decarboxylated at 200° C. This led to a loss in weight of 22%. When a copolymerizate was used for the decarboxylation, the loss in weight was found to be smaller, dependent on the amount of styrene incorporated. The decarboxylations were carried out under a nitrogen atmosphere. The product obtained after decarboxylation was insoluble but could be pulverized. Extraction with methylene chloride did not cause dissolution of the polystyrene which should have been the case if the product had been a physical mixture, since polystyrene remains unchanged at temperatures of 200° C. (vide Houben-Weyl Bond 14/1).

Homopolymerizate. Loss in weight at 200° C.: 22%.

Copolymerizate from monomer mixture: 2-(3′,4′-dihydro-2′-H-pyran-2′-yl)-beta - propiolactone: Styrene=1:1. Loss in weight at 200° C.: 14.5% corresponding with a styrene content of 33%.

Copolymerizate from monomer mixture: 2-(3′,4′-dihydro-2′-H-pyran-2′-yl) - beta-propiolactone: Styrene=1:2. Loss in weight at 200° C.: 12.0% corresponding with a styrene content of 47%. Initiator concentration $5 \times 10^{-3}$ mol/mol of monomer.

EXAMPLE X 270 mg. of silver perchlorate were introduced in a thoroughly dried, 200 ml. round-bottomed flask, which had been purged with dry nitrogen. After purging once more with nitrogen, 40 ml. of monomeric 2-(3′,4′-dihydro-2′-H-pyran-2′-yl)-beta-propiolactone and 40 ml. of methylene chloride (abs.) were pipetted into the flask. The polymerization flask was sealed and cooled to −35° C. in a temperature bath. After the polymerization temperature had been reached, 92 ml. of acetyl chloride were added by means of a syringe. The reaction mixture immediately became cloudy by separated silver chloride. After 22 hours the polymerization was stopped by adding a further 100 ml. of methylene chloride with a little methanol and the viscous polymer solution was freed from solvent in a thin layer evaporator. The polymer was subsequently pulverized and dried in high vacuum.

Initiator concentration: $1.10^{-3}$ mol/mol of monomer. Conversion: 93% $[\eta]:0.05$.

EXAMPLE XI 33 mg. of a $FeCl_3$-propylene oxide complex (prepared according to the description in W. Sorensen and T. W. Campbell's "Preparative Methods of Polymer Chemistry," New York 1961) were introduced in a thoroughly dried 50 ml. flask which had been purged with dry nitrogen. The flask was once more purged with nitrogen and charged at room temperature with 2 ml. of 2-(3′,4′-dihydro-2′-H-pyran-2′-yl)-beta-propiolactone. The initiator dissolved in the monomer and colored the reaction mixture rusty brown. In course of time the reaction mixture became noticeably more viscous and after 2 hours it was solid. The polymerization was stopped after 15 hours by dissolving the material in methylene chloride and the polymer was separated off by precipitation in ether.

Initiator concentration: $1.10^{-2}$ mol/mol of monomer. Conversion: 70% $[\eta]:0.06$.

EXAMPLE XII 135 g. of ketene were introduced with vigorous stirring in a solution of 10 g. of $ZnCl_2$ in 500 ml. of $CH_2Cl_2$, at a temperature ranging from 0° to −10° C., and 194 g. of dimeric acrolein dissolved in 200 ml. $CH_2Cl_2$ were simultaneously added dropwise. Care was taken that the two components were added gradually over a period of 1¾ hours. Stirring was then continued for 2 hours, after which 20 g. of K₂CO₃ dissolved in 100 cu. cm. of water were added dropwise. Subsequently, the mixture was cooled to −40° C., filtered by suction, washed with CH₂Cl₂ and the filtrate allowed to stand overnight at −50° C., after which it was dried with MgSO₄, filtered and distilled. Boiling range (0.5 mm. Hg) 75–92° C. $n_D$ 1.4846. The residue did not decompose. Yield of 2-(3′,4′-dihydro-2′-H-pyran-2′-yl)-beta-propiolactone: 178=∼65% of theory.

EXAMPLE XIII

Example IX is repeated with the exception that the styrene is replaced with equal amounts of each of the following: vinyl acetate, acrylonitrile and methyl methacrylate. Related results are obtained in each case.

EXAMPLE XIV 100 parts of glycidyl polyether of 2,2-bis(4-hydroxyphenyl) propane is combined with 5 parts of benzyldimethylamine and 25 parts of the polymeric lactone produced in Example VIII. The mixture is heated to 150° C. for several hours. The resulting product is a hard solid casting.

EXAMPLE XV

Example XIV is repeated with the exception that the propiolactone is replaced with the styrene dihydropyranyl propiolactone copolymer prepared in Example IX. Related results are obtained.

We claim as our invention:

1. Polymerized unsaturated heterocyclic-substituted propiolactone, the ring heteroatom being oxygen, sulfur or nitrogen, wherein the polymerization takes place through the unsaturated carbon-to-carbon group leaving the lactone groups intact.

2. An addition homopolymer of 2-(3′,4′-dihydro-2′H-pyran-2′yl)-beta-propiolactone possessing intact lactone groups.

3. A copolymer of dihydropyranyl propiolactone and a dissimilar monomer containing a >C=C< group.

4. A copolymer of dihydropyranyl propiolactone and styrene, said copolymer possessing intact lactone groups.

5. A process for preparing polymeric lactones having the lactone groups intact and capable of undergoing further reaction which comprises contacting an unsaturated heterocyclic-substituted lactone, the ring heteroatom being oxygen, sulfur or nitrogen, having a propiolactone group substituted with a heterocyclic ring containing an ethylenic group adjacent to the ring heteroatom, with an ionic initiator.

6. A process as in claim 5 wherein a cationic initiator is employed as the ionic initiator.

7. A process as in claim 5 wherein the initiator used is a member of the group consisting of acetyl perchlorate, boron trifluoride-etherate, titanium tetrachloride and zinc chloride.

8. A process as in claim 5 wherein the initiator is used in an amount of from 0.001 to 5 mol percent.

9. A process as in claim 5 wherein the initiator is added batchwise.

10. A process as in claim 5 wherein the polymerization temperatures are below −20° C.

References Cited

UNITED STATES PATENTS 3,336,265   8/1967   Palm et al. _____ 260—78.3

JOSEPH L. SCHOFER, *Primary Examiner.*

C. A. HENDERSON, *Assistant Examiner.*

U.S. Cl. X.R.

260—2